E. SANTSCHE.
BRAKE MECHANISM.
APPLICATION FILED OCT. 12, 1908.
944,151.
Patented Dec. 21, 1909.
2 SHEETS—SHEET 1.
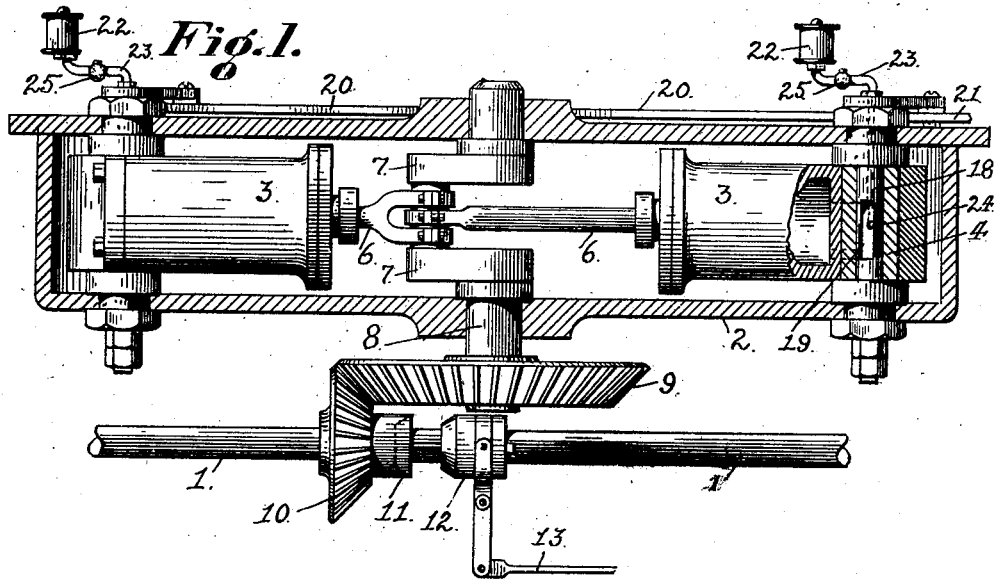
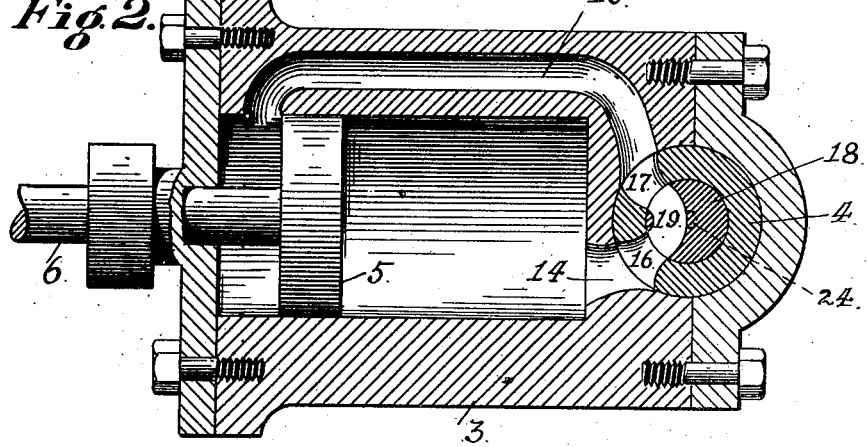
WITNESSES.
Arthur L. Slee.
S. Constines.
INVENTOR.
Emil Santsche
by Wm. F. Booth
his Attorney

E. SANTSCHE.
BRAKE MECHANISM.
APPLICATION FILED OCT. 12, 1908.

944,151.

Patented Dec. 21, 1909.
2 SHEETS—SHEET 2.

WITNESSES.
Arthur L. Slee.
S. Constine.

INVENTOR.
Emil Santsche
by Wm. F. Booth
his Attorney.

UNITED STATES PATENT OFFICE.

EMIL SANTSCHE, OF EUREKA, CALIFORNIA, ASSIGNOR OF TWO-FIFTHS TO JOHN A. PRENTICE AND ONE-FIFTH TO JOSEPH BAGLEY, BOTH OF EUREKA, CALIFORNIA.

BRAKE MECHANISM.

944,151.  Specification of Letters Patent.  Patented Dec. 21, 1909.

Application filed October 12, 1908. Serial No. 457,246.

*To all whom it may concern:*

Be it known that I, EMIL SANTSCHE, a citizen of the United States, residing at Eureka, in the county of Humboldt and State of California, have invented certain new and useful Improvements in Brake Mechanisms, of which the following is a specification.

My invention relates to the class of brakes and is especially adapted for arresting the rotation of shafts.

Though adapted for many purposes, the particular application of my invention is for braking self-propelled vehicles, like automobiles, in which the driving power is transmitted through a shaft.

The object of my invention is to provide a frictionless and noiseless brake for such vehicles, capable of perfect control, efficient, and not likely to get out of order.

To these ends my invention consists in the combination with a rotatable shaft, of a novel controllable fluid-resistance device, and a suitable controllable connection between them, whereby the rotation of the shaft may be retarded and arrested.

It also consists in the novel construction, arrangement and combinations which I shall hereinafter fully describe by reference to the accompanying drawings in which—

Figure 3:
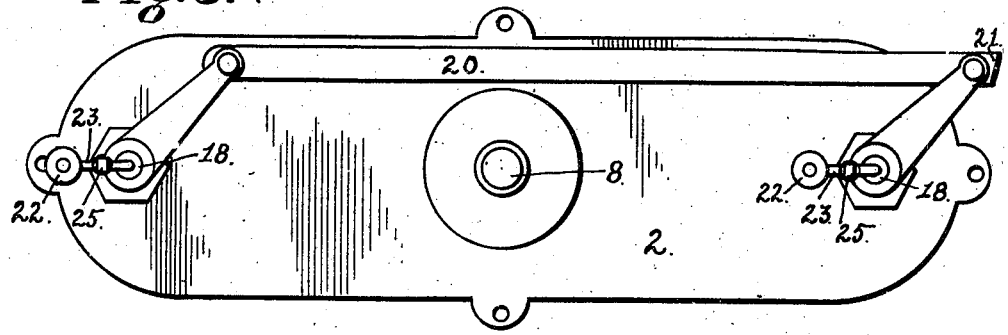
Figure 4:
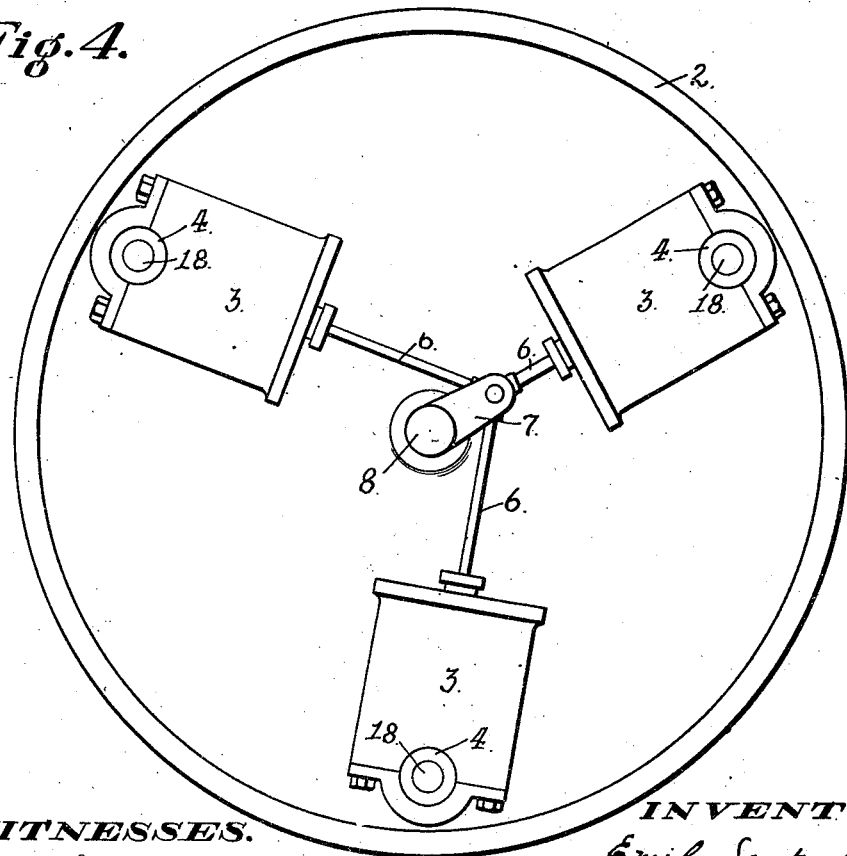

Figure 1 is a side view, partly broken, of my brake-mechanism, the containing casing of the fluid-resistance device being in section. Fig. 2 is a longitudinal section, enlarged, of one of the cylinders of the fluid-resistance device. Fig. 3 is a top view of the casing showing the connection of the valve-pins to operate them in unison. Fig. 4 is a diagrammatic plan view showing an arrangement of three cylinders, comprising the fluid-resistance device.

1 is a shaft to which rotation is imparted, and which, for the purposes of this description, may be assumed to be the drive-shaft of an automobile.

2 is a casing which is to be suitably secured to some portion of the frame of the vehicle. Within this casing are two oppositely disposed cylinders 3, which at their opposite ends are pivotally mounted on pins 4 properly fixed in the casing, thereby adapting the cylinders to oscillate. Within each cylinder is a piston 5, each having a rod 6. These piston rods suitably pass through the inner heads of the cylinders, and are connected with the crank 7 of a shaft 8, mounted in the casing 2. This shaft 8 extends downwardly through the casing and carries on its lower end a bevel gear 9.

On the drive shaft 1 is loosely mounted a bevel gear 10 which engages with the bevel gear 9. With the clutch hub 11 of gear 10, the clutch 12 mounted to rotate with the shaft 1, is adapted, by a suitable connection 13, under the control of the operator, to be thrown into and out of engagement.

In the pivoted end of each cylinder 3 is a port 14, which communicates with the cylinder on one side of its piston. In the cylinder wall is formed a passage 15, which extends from the pivoted end of said cylinder to its other end and there communicates with the cylinder on the other side of its piston, as seen in Fig. 2.

In the pivot pin 4 of each cylinder is a port 16, which communicates with the cylinder-port 14, and also in said pin is a port 17 which communicates with the end of the cylinder passage 15. The ends of these ports 16 and 17, where they communicate with the cylinder port and passage are best made flaring, as shown, in order to preserve the communication under the limited oscillation of the cylinder on the pin.

The pivot pins 4 are hollow or bored out, and in each is fitted a valve-pin 18 adapted to turn on its axis therein. The valve-pin has a port 19 which by the axial movement of said valve-pin is adapted to control the pivot-pin ports 16 and 17 to open them fully, or to partially or wholly close them.

To operate the valve-pins 18 in unison, their upper ends, above the casing are connected by a link 20, from which extends a connection 21 to within the reach and control of the operator.

In order to keep the supply of the fluid constant in the cylinders and compensate for leakage, cups 22 are provided, with pipes 23 leading to a central duct 24 in the valve-pins, the lower end of the duct opening out into the port 19 of said pins. A check valve 25 is fitted in the pipes 23.

Any suitable fluid may be in the cylinders 3, gaseous or liquid.

Assuming, for the purposes of this description, that oil, which for many reasons is to be preferred, is in the cylinders, then the operation is as follows:—Normally, the clutch 12 lies out of engagement with the clutch-hub 11 of the loose gear 10, and there is, therefore, no connection between the drive shaft 1 and the resistance device, and the shaft turns without braking resistance. But when occasion requires, the clutch 12 is thrown to engagement with the clutch-hub of gear 10, which thereby effects the rotation of said gear. Motion is thereupon transmitted through gear 9, shaft 8, and crank 7 to the pistons 5 of the cylinders 3, the latter oscillating on their pivot pins 4 to accommodate the circular path of the crank. The pistons force the oil contained in the cylinders, through the head-ports 14, pivot-pin ports 16 and 17, valve-pin ports 19, and cylinder passages 15, in a continuous course from one side of the pistons to the other side. Now by turning the valve-pins 18 so that their ports 19 will control the capacity of this course, the resistance of the oil may be varied to suit the conditions. This resistance has the effect of retarding or arresting the rotation of the shaft 1 thereby serving as a brake.

It is obvious that the gear-connection between the rotating shaft 1 and the fluid-resistance device is only one form of transmission connection which may be employed; and it is equally plain that my invention is not confined to the employment of a pair of pistons, for one, or three or more may be used, if desired. Thus, in Fig. 4, I show an arrangement of three cylinders which explains itself, the designating numerals being the same as those heretofore applied to corresponding parts.

Having thus described my invention what I claim as new and desire to secure by Letters Patent is:—

1. In combination with a rotatable driving shaft; a fluid-containing cylinder having a passage connecting its ends; a pivot connection at one end of the cylinder to permit its oscillation; a valve seated in the axis of oscillation of said cylinder, adapted to control said passage; a piston in the cylinder having a rod passing out through one head of the cylinder; a crank-shaft to which said piston rod is connected; power transmitting devices from the rotatable shaft to operate the crank shaft, and means for throwing said transmitting devices into and out of action.

2. In combination with a rotatable driving shaft; a plurality of fluid-containing cylinders each having a passage connecting its ends; a pivot connection at the outer end of each cylinder to permit its oscillation; a valve seated in the axis of oscillation of each cylinder, adapted to control the passage therein; connections for operating said valves in unison; a piston in each cylinder having a rod passing out through the inner end thereof; a crank shaft to which all of said piston rods are connected in common; power transmitting devices from the rotatable shaft to operate the crank shaft, and means for throwing said transmitting devices into and out of action.

3. In combination with a rotatable driving shaft, a fluid-containing cylinder having a passage connecting its ends, a pin upon which one end of said cylinder is pivoted, said pin having ports registering with the interior of the cylinder and with its passage, whereby the fluid may pass from one end of the cylinder to the other and return, a valve-pin rotatably mounted in said pivot pin and having a port disposed to control the ports in said pivot-pin, a piston in the cylinder having a rod passing out through one head of the cylinder, a crank shaft to which said piston rod is connected, power transmitting devices from the rotatable shaft to operate the crank shaft, and means for throwing said transmitting devices into and out of action.

4. In combination with a rotatable driving shaft; a plurality of fluid-containing cylinders each having a passage connecting its ends; pins upon which the outer ends of the cylinders are pivoted; said pins having ports registering with the interior of the cylinders and with their passages, whereby the fluid may pass from one end of each cylinder to its other end and return; a valve-pin rotatably mounted in each pivot pin and having a port disposed to control the ports in said pivot pin; connections for operating said valve-pins in unison; a piston in each cylinder having a rod passing out through the inner end thereof; a crank shaft to which all of said piston rods are connected in common; power transmitting devices from the rotatable shaft to operate the crank shaft, and means for throwing said transmitting devices into and out of action.

In testimony whereof I have signed my name to this specification in the presence of two subscribing witnesses.

EMIL SANTSCHE.

Witnesses.
JOHN S. DEUEL,
G. A. McLEAN.